US005789011A

United States Patent [19]
Kobori et al.

[11] Patent Number: 5,789,011
[45] Date of Patent: Aug. 4, 1998

[54] MODIFIER FOR PROTEIN-CONTAINING MATERIALS AND MODIFIER COMPOSITION

[75] Inventors: Jun Kobori, Kamisu-machi; Yoji Kameo, Hasakimachi; Naoki Hosoya, Hasakimachi; Tomoko Fukunaga, Hasakimachi; Yoshihide Azabu, Hasakimachi; Takeshi Yasumasu, Hasaki-machi; Hideo Maeda, Tomisatomachi, all of Japan

[73] Assignee: Kao Corporation, Tokyo, Japan

[21] Appl. No.: 693,250

[22] PCT Filed: Jun. 21, 1995

[86] PCT No.: PCT/JP95/01242

§ 371 Date: Aug. 19, 1995

§ 102(e) Date: Aug. 19, 1995

[87] PCT Pub. No.: WO96/19118

PCT Pub. Date: Jun. 27, 1996

[30] Foreign Application Priority Data

Dec. 22, 1994 [JP] Japan ..................... 6-336453

[51] Int. Cl.$^6$ .............. A21D 2/00; A23D 9/007; A23J 3/32
[52] U.S. Cl. .............. 426/611; 426/602; 426/549; 426/656; 554/1
[58] Field of Search .............. 426/611, 602, 426/549, 656; 554/1

[56] References Cited

U.S. PATENT DOCUMENTS 3,615,681  10/1971  DuRoss .
4,335,157  6/1982  Varvil .

FOREIGN PATENT DOCUMENTS 61-234733  10/1986  Japan .
64-2523    1/1989   Japan .
2-124052   5/1990   Japan .
4-23940    1/1992   Japan .

OTHER PUBLICATIONS

Baranova 1986 Zh. Prekl. Khem. 59(12)2712–16 in Chemical Abstracts 106:122656.

Mank 1989 Chem. Phys. Lipids 50(1) 63–70 in Chemical Abstract 111:214099.

*Primary Examiner*—Carolyn Paden
*Attorney, Agent, or Firm*—Oblon, Spivak, McClelland, Maier & Neustadt, P.C.

[57] ABSTRACT

A diglycerol saturated fatty acid ester mixture containing a diglycerol saturated fatty acid diester(s) having two monohydroxymonoacyloxy(iso)propyl groups, wherein the acyl groups are derived from saturated fatty acids having 10 to 24 carbon atoms and two acyl groups are the same or different from each other, in an amount of 80% by weight or more based on the total weight of the diglycerol saturated fatty acid diesters contained in the mixture, and a diglycerol saturated fatty acid diester(s) in an amount of 45% by weight or more based on the entire weight of the mixture, is used as a modifier for protein-containing materials, in particular, for the control of the stickiness on the surface of the dough during the production thereof, for the improvements of the mechanical resistance and the handleability, and for the improvements of the feelings during eating, such as softness.

53 Claims, No Drawings

MODIFIER FOR PROTEIN-CONTAINING MATERIALS AND MODIFIER COMPOSITION

BACKGROUND OF THE INVENTION

1. Field of the Invention

The present invention relates to a modifier for protein-containing materials which comprises a specific diglycerol saturated fatty acid ester mixture, a modifier composition for protein-containing materials which comprises a specific diglycerol saturated fatty acid ester mixture and other components, a wheat flour product produced by using a specific diglycerol saturated fatty acid ester mixture and a method for modifying a protein-containing material which comprises using a specific diglycerol saturated fatty acid ester mixture. When the modifiers and the modifier compositions of the present invention are added to foods which are prepared by using, as raw materials, protein-containing materials such as wheat flour, the properties of the dough and the feelings of the product during eating can be improved.

2. Description of the Related Art

Foods using wheat flour, such as breads, noodles and baked cakes, are prepared by adding common salt and water to the wheat flour employed as the main material (and further adding thereto yeast for the production of breads, and egg and fats and/or oils for the production of baked cakes). To produce breads among these foods, fats and/or oils, sugars, dairy products and/or various additives, in addition to the above-mentioned materials, are also employed in many cases, so as to provide a bread with excellent qualities or particular characteristics or to improve the handleability.

As described also in each of Japanese Patent Publication-A Nos. 61-234733, 64-2523, 2-124052 and 4-23940, monoglycerol fatty acid esters have been widely used as an additive for producing breads. Further, there has also been proposed to use lecithin, sucrose fatty acid esters, organic acid fatty acid esters, polyglycerol fatty acid esters [see U.S. Pat. Nos. 3,615,681 (patented on Oct. 26, 1971, assignee: Atlas Chemical Industries Inc.) and 4,335,157 (patented on Jun. 15, 1982, assignee: SCM Corporation)] etc. directly as additives for producing breads, or as one raw material for materials for producing breads. These additives may be added to the dough during the production thereof either as such or in the form of an emulsion. It is believed that, since the stickiness on the surface of the dough is controlled and the mechanical resistance of the dough is enhanced by using these additives in the production of breads, the handleability is improved, and that, simultaneously, a softness is imparted to the product and also the feelings during eating, such as solubility in the mouth, are improved.

As the results of studies on the performances of various additives conventionally employed in the art, however, the present inventors have found that the improvements in the dough properties and the feelings during eating by the use of the conventional additives are not fully satisfactory and have understood that there is room for further improvements.

DISCLOSURE OF THE INVENTION

Summary of the Invention

An object of the present invention is to provide a modifier for protein-containing materials, which comprises a diglycerol saturated fatty acid ester mixture containing specific diglycerol saturated fatty acid diesters at a specific ratio, and a modifier composition containing this modifier. Further, another object of the present invention is to provide a wheat flour product prepared by using the above-mentioned diglycerol saturated fatty acid ester mixture. Furthermore, another object of the present invention is to provide a method for modifying a protein-containing material which comprises using the above-mentioned diglycerol saturated fatty acid ester mixture.

The present inventors have paid their attention to polyglycerol fatty acid esters from among the conventional additives as described above and studied the use of the same. As a result, they have found that diglycerol saturated fatty acid diesters, in particular, those having a structure wherein two glycerol groups constituting the diglycerol have each a hydroxyl group and a saturated fatty acid-derived acyloxy group are useful in the modification of a protein-containing material. The present invention has been accomplished on the basis of this finding.

Thus, the present invention provides a modifier for protein-containing materials essentially consisting of a diglycerol saturated fatty acid ester mixture which contains a diglycerol saturated fatty acid diester(s) having two monohydroxymonoacyloxy-(iso)propyl groups, wherein the acyl groups are derived from saturated fatty acids having 10 to 24 carbon atoms and two acyl groups are the same or different from each other, in an amount of 80% by weight or more based on the total weight of the diglycerol saturated fatty acid diesters contained in the mixture.

The present invention further provides a modifier for protein-containing materials essentially consisting of a diglycerol saturated fatty acid ester mixture which contains a diglycerol saturated fatty acid 1,6-diester(s) (wherein the carbon atom numbers of the fatty acids are from 10 to 24) in an amount of 40% by weight or more based on the total weight of the diglycerol saturated fatty acid diesters contained in the mixture.

The present invention furthermore provides a modifier for protein-containing materials essentially consisting of a diglycerol saturated fatty acid ester mixture which contains at least one member selected from the group consisting of diglycerol saturated fatty acid diesters represented by the following formulae (I), (II) and (III) in an amount of 60% by weight or more based on the total weight of the diglycerol saturated fatty acid diesters contained in the mixture:

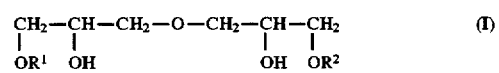  (I)

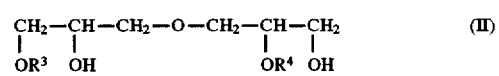  (II)

and

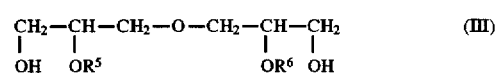  (III)

wherein $R^1$, $R^2$, $R^3$, $R^4$, $R^5$ and $R^6$ each independently represents a saturated aliphatic acyl group having 10 to 24 carbon atoms.

In the above-mentioned modifier for protein-containing materials, the diglycerol saturated fatty acid ester mixture is preferably a mixture wherein the total amount of the diglycerol saturated fatty acid diesters contained in the mixture is 45% by weight or more based on the weight of the mixture.

The present invention provides a modifier composition for protein-containing materials which comprises any of the above-mentioned diglycerol saturated fatty acid ester mixtures and water, wherein the mixture is dispersed in the water, and a modifier composition for protein-containing materials which comprises any of the above-mentioned diglycerol saturated fatty acid ester mixture and a fat and/or oil, wherein the mixture is dissolved or dispersed in the fat and/or oil.

These modifier compositions for protein-containing materials each contains preferably a diglycerol saturated fatty acid diester(s) having two monohydroxymonoacyloxy(iso)propyl groups in an amount of 1% by weight or more based on the entire weight of the composition.

Further, when the above-mentioned diglycerol saturated fatty acid ester mixture contains a diglycerol saturated fatty acid 1,6-diester(s), these modifier compositions for protein-containing materials each contains preferably the diglycerol saturated fatty acid 1,6-diester(s) in an amount of 0.5% by weight or more based on the entire weight of the composition.

Furthermore, when the above-mentioned diglycerol saturated fatty acid ester mixture contains at least one member selected from the group consisting of diglycerol saturated fatty acid diesters represented by the above formulae (I), (II) and (III), these modifier composition for protein-containing materials each contains preferably the diglycerol saturated fatty acid diester(s) represented by the above formulae (I), (II) and (III) in an amount of 1% by weight or more based on the entire weight of the composition.

The present invention provides a modifier composition for protein-containing materials which comprises, based on the entire weight of the composition, 1 to 50% by weight of any of the above-mentioned diglycerol saturated fatty acid ester mixtures, 5 to 50% by weight of an edible fat(s) and/or oil(s), and/or a diglyceride(s), and 20 to 85% by weight of water, and is in the form of an oil-in-water type emulsion.

These modifier compositions for protein-containing materials each may contain, further, 5 to 40% by weight of a sugar(s) based on the entire weight of the composition.

The present invention provides a modifier composition for protein-containing materials which comprises, based on the entire weight of the composition, 1 to 50% by weight of any of the above-mentioned diglycerol saturated fatty acid ester mixtures, 30 to 99% by weight of an edible fat(s) and/or oil(s), and/or a diglyceride(s), and 0.1 to 60% by weight of water, and is in the form of a water-in-oil type emulsion.

The present invention further provides a wheat flour product prepared by using any of the above-mentioned diglycerol saturated fatty acid ester mixtures.

The present invention is useful particularly in the case where the wheat flour product is a bread, a noodle or a baked cake.

The present invention furthermore provides a method for modifying a protein-containing material which comprises using any of the above-mentioned diglycerol saturated fatty acid ester mixtures.

The reasons why the properties of the dough prepared by using a protein-containing material are to be excellent and why the feelings of the products during eating are improved, by using the modifier or the modifier composition for protein-containing materials of the present invention together with the protein-containing material, in particular, wheat flour, are not clear. However, it is presumed that they are caused by some interactions between proteins such as wheat protein and the diglycerol saturated fatty acid diesters having specific structures as described above. It is conceivable that as the result of these interactions, the elasticity of the dough is elevated, its stickiness is suppressed, and the solubility in the mouth and the easiness of being cut off with the teeth of the product are improved.

As described above, the modifier and the modifier composition for protein-containing materials of the present invention are excellent particularly in the function of suppressing the stickiness of the dough surface in the production of a wheat flour product and contribute to the improvement of the mechanical resistance of the dough. As the result, the handleability in the production of the wheat flour product is improved. Further, the modifier and the modifier composition for protein-containing materials of the present invention impart softness to the product and, simultaneously, contribute to the improvements in its feelings such as solubility in the mouth and easiness of being cut off with the teeth.

It has conventionally been known that, in the production of breads, a soft and moist product can be obtained by increasing the content of the water in the dough. However, an increase in the content of the water in the dough results in a higher stickiness of the dough and a considerably worsened handleability, thus making the production of bread difficult. By using the modifier or the modifier composition for protein-containing materials of the present invention, the elasticity of the dough is elevated and the stickiness thereof is suppressed, even when the content of the water in the dough is high. Accordingly, the use of the modifier or the modifier composition for protein-containing materials of the present invention makes it possible to prepare a dough having a high water content and, in its turn, to improve also the taste of bread.

Furthermore, in the case that the product is a noodle, it is conceivable that a viscoelasticity is imparted to the noodle as the result of the above-mentioned interactions.

DETAILED DESCRIPTION OF THE INVENTION

The "diglycerol saturated fatty acid ester mixture" in the present invention means:

(1) a mixture containing a diglycerol saturated fatty acid diester(s) having two monohydroxymonoacyloxy(iso)propyl groups, wherein the acyl groups are derived from saturated fatty acids having 10 to 24 carbon atoms and two acyl groups are the same or different from each other, in an amount of 80% by weight or more, preferably from 90 to 100% by weight, based on the total weight of the diglycerol saturated fatty acid diesters contained in the mixture;

(2) a mixture containing a diglycerol saturated fatty acid 1,6-diester(s) (wherein the carbon atom numbers of the fatty acids are from 10 to 24) in an amount of 40% by weight or more, preferably 50% by weight or more, based on the total weight of the diglycerol saturated fatty acid diesters contained in the mixture; and (3) a mixture containing at least one member selected from the group consisting of diglycerol saturated fatty acid diesters represented by the above formulae (I), (II) and (III) in an amount of 60% by weight or more, preferably 70% by weight or more and still more preferably 80 to 100% by weight based on the total weight of the diglycerol saturated fatty acid diesters contained in the mixture; which contain a diglycerol saturated fatty acid diester(s), and may contain a diglycerol saturated fatty acid monoester(s), a diglycerol saturated fatty acid triester(s) and a diglycerol saturated fatty acid tetraester(s).

As the "diglycerol saturated fatty acid ester mixture" in the present invention, a mixture containing a diglycerol saturated fatty acid diester(s) in an amount of 45% by weight or more based on the weight of the mixture is preferable.

The diglycerol which is the starting material of diglycerol saturated fatty acid diesters is a dimer of glycerol having a structure wherein two glycerol molecules have been condensed with each other with the loss of one water molecule. Diglycerols includes isomers such as linear diglycerol formed by condensing by dehydration glycerols with each other at the primary hydroxyl groups, a branched diglycerol formed by condensing by dehydration glycerols with each other at the primary hydroxyl group and the secondary hydroxyl group, or at the secondary hydroxyl groups, and cyclic diglycerols formed by the intramolecular dehydration of a diglycerol.

The diglycerol can be synthesized by condensing glycerols by dehydration, or can be synthesized from compounds analogous to glycerol such as glycidol and epichlorohydrin. The diglycerol can be isolated by converting the reaction product into a derivative such as acetal followed by fractionation or by fractionating the reaction product per se. In the present invention, use can be made of a mixture comprising a diglycerol(s) as the major component, which can be obtained by the industrial synthesis of a diglycerol(s), as the starting material of the diglycerol saturated fatty acid ester mixture. This mixture may contain about 20% by weight of a triglycerol(s).

Although the ratio of diglycerol isomers varies depending on the production method, it is preferable in the present invention to use, as the starting material of the diglycerol saturated fatty acid ester mixture, a mixture wherein the diglycerol(s) contained therein is mainly linear diglycerol.

The above-mentioned diglycerol(s) or a mixture comprising a diglycerol(s) as the main component(s) is reacted with a saturated fatty acid(s) to give a diglycerol saturated fatty acid ester mixture comprising a diglycerol saturated fatty acid diester(s) as the main component(s). The saturated fatty acids employed herein are those having 10 to 24, preferably 12 to 22 and still more preferably 16 to 20, carbon atoms. Further, saturated fatty acids are preferably linear ones. Examples of the saturated fatty acids include capric acid, lauric acid, myristic acid, palmitic acid, stearic acid, arachidic acid and behenic acid.

When use is made of one containing linear diglycerol as the starting material, the diglycerol saturated fatty acid diesters contained in the diglycerol saturated fatty acid ester mixture include four isomers, i.e., a diglycerol saturated fatty acid 1,6-diester represented by the above-mentioned formula (I) (hereinafter sometimes referred to simply as "the 1,6-isomer"), a diglycerol saturated fatty acid 1,5-diester represented by the above-mentioned formula (II) (hereinafter sometimes referred to simply as "the 1,5-isomer"), a diglycerol saturated fatty acid 2,5-diester represented by the above-mentioned formula (III) (hereinafter sometimes referred to simply as "the 2,5-isomer") and a diglycerol saturated fatty acid 1,2-diester (hereinafter sometimes referred to simply as "the 1,2-isomer"). Among these isomers, those corresponding to diglycerol saturated fatty acid diesters having two monohydroxymonoacyloxy(iso)propyl groups, wherein the acyl groups are derived from saturated fatty acids having 10 to 24 carbon atoms and two acyl groups are the same or different from each other, are the 1,6-isomer, the 1,5-isomer and the 2,5-isomer.

As the diglycerol saturated fatty acid ester mixture of the present invention, those having a small content of the 1,2-isomer are preferred. More specially, the content of the 1,2-isomer is preferably less than 20% by weight, still more preferably less than 15% by weight and particularly preferably less than 10% by weight, based on the total weight of the diglycerol saturated fatty acid diesters.

While, when use is made of one containing a branched diglycerol(s) as the starting material, the diglycerol saturated fatty acid diesters contained in the diglycerol saturated fatty acid ester mixture include two isomers, i.e., one having a monohydroxymonoacyloxypropyl group and a monohydroxymonoacyloxy-isopropyl group (one derived from a branched diglycerol formed by condensing by dehydration glycerols with each other at the primary hydroxyl group and the secondary hydroxyl group) and one having two monohydroxymonoacyloxyisopropyl groups (one derived from a branched diglycerol formed by condensing by dehydration glycerols with each other at the secondary hydroxyl groups), as the diglycerol saturated fatty acid diesters. These isomers each corresponds to a diglycerol saturated fatty acid diester having two monohydroxymonoacyloxy(iso)propyl groups wherein the acyl groups are derived from saturated fatty acids having 10 to 24 carbon atoms and two acyl groups are the same or different from each other.

On the other hand, a diglycerol saturated fatty acid diester obtained by the reaction between a cyclic diglycerol formed by intramolecular dehydration of a diglycerol with a saturated fatty acid does not correspond to a diglycerol saturated fatty acid diester having two monohydroxymonoacyloxy (iso)propyl groups wherein the acyl groups are derived from saturated fatty acids having 10 to 24 carbon atoms and two acyl groups are the same or different from each other, since it has no hydroxyl group.

The diglycerol saturated fatty acid ester mixture to be used as a modifier in the present invention may contain, in addition to the diglycerol saturated fatty acid diester(s), for example, an unreacted diglycerol(s), an unreacted fatty acid(s), a diglycerol saturated fatty acid monoester(s), a diglycerol saturated fatty acid triester(s) and a diglycerol saturated fatty acid tetraester(s), as its components.

As the diglycerol saturated fatty acid ester mixture, one containing a diglycerol saturated fatty acid diester(s) in an amount of 45% by weight or more based on the weight of the mixture is preferable, as described above. That is, as the diglycerol saturated fatty acid ester mixture to be used in the present invention, preferred are:

(1') a mixture containing a diglycerol saturated fatty acid diester(s) having two monohydroxymonoacyloxy(iso) propyl groups wherein the acyl groups are derived from saturated fatty acids having 10 to 24 carbon atoms and two acyl groups are the same or different from each other, in an amount of 36% by weight or more based on the weight of the diglycerol saturated fatty acid ester mixture;

(2') a mixture containing a diglycerol saturated fatty acid 1,6-diester(s) (wherein the carbon atom numbers of the fatty acids are from 10 to 24), in an amount of 18% by weight or more based on the weight of the diglycerol saturated fatty acid ester mixture; and (3') a mixture containing at least one member selected from the group consisting of diglycerol saturated fatty acid diesters represented by the above formulae (I), (II) and (III), in an amount of 27% by weight or more based on the weight of the diglycerol saturated fatty acid ester mixture.

In the case of the above-mentioned (1'), the diglycerol saturated fatty acid diesters having the specific structures as described above (i.e., the 1,6-, 1,5- and 2,5-isomers and the branched ones) are still more preferably contained in the diglycerol fatty acid ester mixture in an amount of 45% by weight or more, in particular, 55 to 100% by weight.

When the diglycerol saturated fatty acid diesters comprise linear diglycerol saturated fatty acid diesters, it is preferable that they have a composition comprising from 20 to 100% by weight (still more preferably from 40 to 100% by weight) of a diglycerol saturated fatty acid 1,6-diester(s), from 0 to 50% by weight (still more preferably from 25 to 45% by weight) of a diglycerol saturated fatty acid 1,5-diester(s) and from 0 to 10% by weight (still more preferably from 0 to 5% by weight) of a diglycerol saturated fatty acid 2,5-diester(s), optionally together with those having other structures (for example, the 1,2-isomer).

While, when the diglycerol saturated fatty acid diesters comprise a linear diglycerol saturated fatty acid diester(s) and a branched diglycerol saturated fatty acid diester(s), it is preferable that the diglycerol saturated fatty acid diesters have such a composition that a diglycerol saturated fatty acid 1,6-diester(s) is from 20 to 99% by weight (still more preferably from 40 to 99% by weight) and total amount of a diglycerol saturated fatty acid 1,5-diester(s), a diglycerol saturated fatty acid 2,5-diester(s) and a branched diglycerol saturated fatty acid diester(s) is from 1 to 80% by weight (still more preferably from 1 to 60% by weight).

The diglycerol saturated fatty acid ester mixture according to the present invention can be produced by a chemical synthetic method or a synthetic method by an enzymatic reaction. The synthetic method by the enzymatic reaction has such an advantage that the diglycerol saturated fatty acid diesters having the specific structures as described above can be obtained at a high concentration efficiently. However, the method for the synthesis of the diglycerol saturated fatty acid ester mixture according to the present invention is not particularly restricted thereto.

As the chemical synthetic method for obtaining the diglycerol saturated fatty acid ester mixture according to the present invention, use can be made of a common ester synthetic method. The diglycerol saturated fatty acid diester mixture can be obtained by, for example, reacting a diglycerol with a saturated fatty acid or a lower alkyl ester of a saturated fatty acid while eliminating water or a lower alcohol thus formed from the system. By distilling the reaction product thus obtained to eliminate an unreacted material(s), and/or, by effecting some operation for separation or fractionation using, e.g., chromatography, a diglycerol saturated fatty acid ester mixture containing the diglycerol saturated fatty acid diester(s) having the specific structure(s) at a high concentration can be obtained.

While, when the synthetic method by an enzymatic reaction is used, the diglycerol saturated fatty acid ester mixture can be obtained by reacting a diglycerol(s) with a saturated fatty acid or a lower alkyl ester of a saturated fatty acid in the presence of an enzyme capable of esterifying glycerol selectively at the $\alpha$a-position (for example, immobilized lipase or endolipase) while eliminating water or a lower alcohol thus formed from the system, and then removing the enzyme from the reaction product thus obtained. By distilling the reaction product thus obtained to eliminate an unreacted material(s), and/or, by effecting some operation for separation or fractionation using, e.g., chromatography, a diglycerol saturated fatty acid ester mixture containing the diglycerol saturated fatty acid diester(s) having the specific structure(s) at a high concentration can be obtained.

When any of methods is employed for obtaining a diglycerol saturated fatty acid ester mixture, it is important to obtain a diglycerol saturated fatty acid ester mixture containing the diglycerol saturated fatty acid diester(s) having the specific structure(s) at a high concentration. In addition, it is preferable to obtain a diglycerol saturated fatty acid ester mixture having a high diglycerol saturated fatty acid diester content.

The diglycerol saturated fatty acid ester mixture containing the diglycerol saturated fatty acid diester(s) having the specific structure(s) described above is advantageously usable as a modifier for protein-containing materials, in particular, protein-containing foods.

In the present invention, it is particularly advantageous to use, as the diglycerol saturated fatty acid ester mixture, a mixture containing the diglycerol saturated fatty acid diester (s) having the specific structure(s) described above in an amount of 80% by weight or more based on the total weight of the diglycerol saturated fatty acid diesters contained in the mixture, or a mixture containing a diglycerol saturated fatty acid 1,6-diester(s) in an amount of 40% by weight or more based on the total weight of the diglycerol saturated fatty acid diesters contained in the mixture.

A diglycerol saturated fatty acid ester mixture which contains the above-mentioned specific diglycerol saturated fatty acid diester(s) in an amount of 80% by weight or more based on the total weight of the diglycerol saturated fatty acid diesters contained in the diglycerol saturated fatty acid ester mixture may be used as such as a modifier. However, it is preferable to use the ester mixture in the form of a modifier composition containing the ester mixture in such an amount that the total amount of the above-mentioned diglycerol saturated fatty acid diesters having the specific structures (i.e., the 1,6-, 1,5-and 2,5-isomers and the branched one) contained in the ester mixture is 1% by weight or more, preferably from 5 to 50% by weight, based on the entire weight of the composition. Further, in the case of a diglycerol saturated fatty acid ester mixture containing a diglycerol saturated fatty acid 1,6-diester(s) in an amount of 40% by weight or more based on the total weight of the diglycerol saturated fatty acid diesters contained in the diglycerol saturated fatty acid ester mixture, it is preferable to use the ester mixture in the form of a modifier composition containing the diglycerol saturated fatty acid ester mixture according to the present invention in such an amount that the amount of the diglycerol saturated fatty acid 1,6-diester(s) is 0.5% by weight or more, preferably from 2 to 50% by weight, based on the entire weight of the composition. Furthermore, in the case of a diglycerol saturated fatty acid ester mixture containing at least one member selected from the group consisting of diglycerol saturated fatty acid diesters represented by the above formulae (I), (II) and (III) in an amount of 60% by weight or more based on the total weight of the diglycerol saturated fatty acid diesters contained in the diglycerol saturated fatty acid ester mixture, it is preferable to use the ester mixture in the form of a modifier composition containing the diglycerol saturated fatty acid ester mixture according to the present invention in such an amount that the total amount of the diglycerol saturated fatty acid diesters represented by the above formulae (I), (II) and (III) is 1% by weight or more, preferably 5 to 50% by weight, based on the entire weight of the composition.

The modifier composition containing the diglycerol saturated fatty acid ester mixture of the present invention may be in various forms depending on the protein-containing material to be modified therewith. Preferable examples of the forms thereof include a form of a dispersion wherein the above-mentioned ester mixture is dispersed in water (more particularly, a form of a dispersion wherein the above-mentioned ester mixture is dispersed in water with the use of an appropriate emulsifier, or a form wherein a composition comprising the above-mentioned ester mixture and water forms a gel in the presence or absence of an appropriate emulsifier), a form of an oil-in-water type emulsion containing the above-mentioned ester mixture, a form wherein the above-mentioned ester mixture is dissolved or dispersed in a fat and/or oil, preferably an edible fat(s) and/or oil(s), and a form of a water-in-oil type emulsion containing the above-mentioned ester mixture.

In the case of a modifier composition having a form wherein the above-mentioned diglycerol saturated fatty acid ester mixture is dispersed in water, the weight ratio of the mixture to water (mixture : water) is preferably from 1:0.5 to 1:1,000, still more preferably from 1:1 to 1:50.

In the case of a modifier composition having a form wherein the above-mentioned diglycerol saturated fatty acid ester mixture and water form a gel, the weight ratio of the mixture to water (mixture : water) is preferably from 1:0.5 to 1:1,000, still more preferably from 1:1 to 1:50.

As the oil-in-water type emulsion containing the above-mentioned diglycerol saturated fatty acid ester mixture, for example, those having the following compositions are preferable:

(1) an emulsion comprising, based on the entire weight of the emulsion, 1 to 50% by weight (preferably 5 to 20% by weight) of the diglycerol saturated fatty acid ester mixture, 5 to 50% by weight (preferably 5 to 30% by weight) of an edible fat(s) and/or oil(s), and/or a diglyceride(s), and 20 to 85% by weight (preferably 20 to 70% by weight) of water; and (2) an emulsion comprising, based on the entire weight of the emulsion, 1 to 50% by weight (preferably 5 to 20% by weight) of the diglycerol saturated fatty acid ester mixture, 5 to 50% by weight (preferably 5 to 30% by weight) of an edible fat(s) and/or oil(s), and/or a diglyceride(s), 5 to 40% by weight (preferably 15 to 35% by weight) of a sugar(s), and 20 to 85% by weight (preferably 20 to 70% by weight) of water.

In the case of a modifier composition having a form wherein the above-mentioned diglycerol saturated fatty acid ester mixture is dissolved or dispersed in a fat and/or oil, the weight ratio of the mixture to the fat and/or oil (mixture : fat and/or oil) is preferably from 1:2 to 1:1,000, still more preferably from 1:2 to 1:100.

Further, as the water-in-oil type emulsion containing the above-mentioned diglycerol saturated fatty acid ester mixture, for example, one having the following composition is preferable:

an emulsion comprising, based on the entire weight of the emulsion, 1 to 50% by weight (preferably 2 to 50% by weight) of the diglycerol saturated fatty acid ester mixture, 30 to 99% by weight (preferably 50 to 98% by weight) of an edible fat(s) and/or oil(s), and/or a diglyceride(s), and 0.1 to 60% by weight (preferably 1 to 40% by weight) of water.

The edible fat and/or oil to be used in the preparation of the above-mentioned modifier composition may be anyone, as long as it is commonly used for foods, and examples thereof include rapeseed oil, soybean oil, corn oil, safflower oil, olive oil, cottonseed oil, sesame oil, high-erucic rapeseed oil, palm oil, palm kernel oil, coconut oil, milk fat, lard, beef tallow, fish oil and whale oil, and hardened oils, fractionated oils and transesterified oils of them. They may be used alone or in the form of a mixture of two or more members.

While, as the diglyceride, use can be made of one which is prepared with the use of the above-mentioned edible fat and/or oil as the starting material by a known method such as trans-esterification.

To prepare the modifier composition of the present invention, it is preferable to use a mixture of the above-mentioned edible fat(s) and/or oil(s) with a diglyceride(s). In this case, the edible fat(s) and/or oil(s) and the diglyceride(s) are preferably used in such a ratio that the weight ratio of the fat(s) and/or oil(s) to the diglyceride(s) (fat and/or oil : diglyceride) is from 10:1 to 1:2, particularly preferably from 5:1 to 1:1.

Examples of the sugars employed in the above-mentioned oil-in-water type emulsion include sugars such as sucrose, maltose, lactose, glucose, fructose, galactose, starch syrup, isomerized sugars, invert sugars and pullulan; sugar alcohols such as sorbitol, maltitol and xylitol;. reducing sugars such as starch hydrolysates; and polysaccharides such as starch, dextran, glycogen, cellulose, dextrin, inulin, galactan, chitin, alginic acid and pectin. They may be used alone or in the form of a combination of two or more members. Among the above-mentioned ones, polysaccharides containing two or more sugars and sugar alcohols are preferred.

The above-mentioned modifier composition can be prepared in accordance with a conventional method. In the process thereof, an emulsifier may be used at need. Examples of the emulsifiers to be used in the present invention include monoglycerol fatty acid esters, lecithin, sucrose fatty acid esters, organic acid fatty acid esters and sorbitan fatty acid esters. The emulsifier to be used is selected depending on the form of the modifier composition. When the modifier composition is in the form of an emulsion, for example, one or two or more members among lipophilic emulsifiers and one or two or more members among hydrophilic emulsifiers may be used for the oil phase part and the aqueous phase part, respectively. The lipophilic emulsifier(s) may be used in an amount, per 100 parts by weight of the edible fat(s) and/or oil(s) and/or the diglyceride(s), of usually from 0.1 to 50 parts by weight and preferably from 0.5 to 10 parts by weight, while the hydrophilic emulsifier(s) may be used in an amount, per 100 parts by weight of water, of usually from 0.1 to 20 parts by weight and preferably from 1 to 10 parts by weight.

Although the modifier or modifier composition of the present invention is used for modifying protein-containing materials, it is particularly advantageous to use it particularly in foods, especially in wheat-protein-containing foods (wheat flour products) comprising mainly wheat flour such as breads, noodles, pasta, and wrappings of chaotzu and chun-juan. The "breads" herein means products prepared by adding common salt, water (dough water) and yeast food, and other materials such as fats and/or oils (shortening, lard, margarine, butter, liquid oils, etc.), dairy products, sugars, hydrophilic emulsifiers, seasonings (glutamic acid and derivatives thereof, nucleic acids), chemical blowing agents and flavors to the wheat flour as the main material, kneading the mixture thus obtained to give a dough, fermenting the dough and baking. Needless to say, it may be a bread comprising a stuffing such as fillings. That is, the "breads" as defined in the present invention include loaves, special breads, sweet buns, steamed breads, pancakes, etc.

Examples of the loaves include white bread, brown bread, French bread, variety bread and rolls (table rolls, buns, butter rolls, etc.). Examples of the special breads include grissinis, muffins and rusks. Examples of the prepared breads include hot-dogs, hamburgers and pizzas. Examples of the sweet buns include jam buns, bean jam buns, cream buns, raisin buns, melon buns, sweet rolls and rich goods (croissants, brioches, Danish pastries, etc.). Further, examples of the steamed breads include steamed buns with pork filling and steamed buns with bean Jam filling.

The "noodles" means products prepared by adding common salt and water (dough water), and other materials such as fats and/or oils (shortening, lard, margarine, butter, liqeid oils, etc.), proteins, sugars, hydrophilic emulsifiers and flavors to the wheat flour as the main material, and kneading the mixture thus obtained. Examples of the noodles include udon (including kishimen and the like), somen (including hiyamugi and the like), Chinese noodles and buckwheat noodles.

The modifier and the modifier composition of the present invention are also usable for modifying the feelings of baked cakes during eating. Examples of such the baked cakes, to which the modifier or the modifier composition of the present invention is to be added, include biscuits, cookies, sable (sand cakes), crackers and pies.

Although it varies depending on the product to which the modifier of the present invention is added, in the case of the wheat flour products, the modifier is added in an amount, per 100 parts by weight of wheat flour, of preferably from 0.01 to 5 parts by weight, still more preferably from 0.1 to 1 part by weight.

When used in the wheat flour products, the modifier composition of the present invention is used in a range of preferably from 0.02 to 20 parts by weight, still more preferably from 0.02 to 10 parts by weight and particularly preferably from 0.5 to 5 parts by weight per 100 parts by weight of wheat flour.

The modifier or modifier composition of the present invention may also be used together with other modifier(s) or modifier composition(s) which have conventionally been known. Examples of the conventionally known modifiers include monoglycerides, organic acid monoglycerides, glycerol fatty acid esters, propylene glycol fatty acid esters, sorbitan fatty acid esters, sucrose fatty acid esters, phospholipids, ascorbic acid and its derivatives, organic acids, amino acids, salts and enzyme preparations (amylase, protease, etc.).

The diglycerol saturated fatty acid ester mixture according to the present invention which contains a diglycerol saturated fatty acid diester(s) as the main component can be advantageously used as a modifier for protein-containing materials. When the diglycerol saturated fatty acid ester mixture according to the present invention is used in the production of foods using wheat flour, in particular, the elasticity of the dough is elevated, the dough per se becomes more stretchable and the stickiness of the dough is controlled. As the result, the mechanical resistance of the dough is elevated and, simultaneously, the qualities of the product are also improved. Furthermore, the diglycerol saturated fatty acid ester mixture according to the present invention imparts a softness to a product using wheat flour and, simultaneously, improves the feelings during eating (solubility in the mouth, easiness of being cut off with the teeth, etc.). To noodles, in particular, it gives viscoelasticity, thus giving further improved feelings during eating.

EXAMPLES

Now the present invention will be illustrated more specially in reference to Examples and Comparative Examples.

Moreover, "%" means "% by weight".

Example 1

(Preparation of diglycerol distearates) 100 parts by weight of stearic acid was melted by heating to 70°C. Thereto were added 10 parts by weight of an immobilized lipase preparation (trade name: Lipozyme, IM20, mfd. by NOVO) composed of a lipase originating from Mucor miehei immobilized on an anion exchange resin and 29 parts by weight of linear diglycerol. Then the stearic acid was reacted with the linear glycerol under reduced pressure (2 torr) at 70° C. for 4 hours. The reaction product was filtered to eliminate the immobilized enzyme. The obtained filtrate was put in a continuous thin film distilling apparatus and distillation was carried out to eliminate unreacted stearic acid and diglycerol, and monoesters. The liquid thus obtained was subjected to silica gel column chromatography to eliminate triesters, thereby giving a diglycerol distearate mixture comprising diglycerol 1,6-distearate (about 50%), diglycerol 1,5-distearate (about 45%) and diglycerol 2,5-distearate (about 5%).

(Preparation of oil-in-water type emulsion (modifier composition) A)

To 12 parts by weight of the diglycerol distearate mixture obtained above were added 7 parts by weight of glycerol dioleate(s) and 15 parts by weight of refined rapeseed oil. The obtained mixture was heated to 80° C. while stirring to prepare an oily liquid (oil phase part).

Separately, 23 parts by weight of water and 3 parts by weight of sucrose ester S-1170S (HLB11, mfd. by Mitsubishi Chemical Industries Ltd.) were added to 40 parts by weight of a D-sorbitol liquor (70%), and the obtained mixture was mixed at 60° C. to prepare an aqueous liquid (aqueous phase part).

While adding the above aqueous liquid to the above oily liquid at 70° C., emulsification was effected by using a disperser (trade name: PHYSCOTRON, mfd. by Nichion Irika Kikai Seisakusho, K. K.) to give oil-in-water type emulsion A according to the present invention.

Example 2

(Preparation of diglycerol dibehenates)

A diglycerol dibehenate mixture comprising diglycerol 1,6-dibehenate (about 42%), diglycerol 1,5-dibehenate (about 49%,) and diglycerol 2,5-dibehenate (about 9%) was obtained in the same manner as that of the preparation of diglycerol distearates in Example 1 described above, except that behenic acid was used in place of the stearic acid, that 24 parts by weight of linear diglycerol was used and that the reaction temperature was 80° C.

(Preparation of oil-in-water type emulsion (modifier composition) B)

Oil-in-water type emulsion B according to the present invention was obtained in the same manner as that of the preparation of oil-in-water type emulsion A in Example 1 described above, except that the diglycerol dibehenate mixture obtained as described above was used in place of the diglycerol distearate mixture.

Example 3

(Preparation of diglycerol dilaurates)

A diglycerol dilaurate mixture comprising diglycerol 1,6-dilaurate (about 51%), diglycerol 1,5-dilaurate (about 46%) and diglycerol 2,5-dilaurate (about 3%) was obtained in the same manner as that of the preparation of diglycerol distearates in Example 1 described above, except that lauric acid was used in place of the stearic acid, that 41 parts by weight of linear diglycerol was used and that the reaction temperature was 50° C.

(Preparation of oil-in-water type emulsion (modifier composition) C)

Oil-in-water type emulsion C according to the present invention was obtained in the same manner as that of the preparation of oil-in-water type emulsion A in Example 1 described above, except that the diglycerol dilaurate mixture obtained as described above was used in place of the diglycerol distearate mixture.

Example 4

(Preparation of aqueous dispersion (modifier composition) D containing a modifier for protein-containing materials)

To 10 parts by weight of the diglycerol distearate mixture prepared in Example 1 were added 1 part by weight of a sucrose fatty acid ester (trade name: S-1170S, mfd. by Mitsubishi Chemical Industries Ltd.) and 89 parts by weight of water. The obtained mixture was stirred with a disperser at 70° C. to disperse, giving aqueous dispersion D containing a modifier according to the present invention.

Example 5

(Preparation of modifier composition E having a form wherein a modifier is dissolved or dispersed in a fat and/or oil)

To 5 parts by weight of the diglycerol distearate mixture prepared in Example 1 were added 90 parts by weight of shortening (New Econa V, mfd. by Kao Corporation) and 5 parts by weight of rapeseed oil. The mixture thus obtained was heated to 70° C., followed by dissolution and homogenization while stirring. Then it was transferred into a container cooled to 0C and solidified by quenching while stirring to give modifier composition (shortening composition) E according to the present invention.

Example 6

(Preparation of water-in-oil type emulsion (modifier composition) F)

To 2 parts by weight of the diglycerol distearate mixture prepared in Example 1 were added 81 parts by weight of shortening (New Econa V, mfd. by Kao Corporation) and 0.5 part by weight of a monoglycerol fatty acid ester (T-95, mfd. by Kao Corporation). The mixture thus obtained was heated to 70° C., followed by dissolution and homogenization while stirring. Then 16.5 parts by weight of water was added in portions to the homogeneous solution thus obtained while stirring to prepare a water-in-oil type emulsion. The resulting water-in-oil type emulsion was quenched while kneading to give water-in-oil type emulsion (margarine composition) F according to the present invention.

Example 7

100 parts by weight of stearic acid was melted by heating to 70° C. Thereto were added 10 parts by weight of an immobilized lipase preparation (trade name: Lipozyme, IM20, mfd. by NOVO) composed of a lipase originating from Mucor miehei immobilized on an anion exchange resin and 29 parts by weight of diglycerols (69% of linear diglycerol and 31% of a branched diglycerol(s)). Then the stearic acid was reacted with the diglycerols under reduced pressure (2 torr) at 70° C. for 4 hours. The reaction product was filtered to eliminate the immobilized enzyme. The obtained filtrate was put in a continuous thin film distilling apparatus and distillation was carried out to eliminate most of unreacted stearic acid and diglycerols, and most of monoesters. Thus 86 parts by weight of crude diglycerol distearates were obtained. 86 parts by weight of the crude diglycerol distearates thus obtained were added to 350 parts by weight of acetone and dissolved in the acetone by heating. Thereafter, the obtained acetone solution was cooled to 0C to precipitate crystals. The crystals were collected by filtration and dried under reduced pressure to give a white solid (acetone-crystallization product).

When the thus-obtained white solid (acetone-crystallization product) was analyzed by gas chromatography, it comprised 1.9% of diglycerol monostearates, 67.4% of diglycerol distearates, 26.5% of diglycerol tristearates and 4.2% of diglycerol tetrastearates.

A portion of the white solid (acetone-crystallization product) thus obtained was subjected to silica gel column chromatography and a diester fraction was separated therefrom. When the diester fraction (diglycerol distearate mixture) thus obtained was analyzed by gas chromatography, it has such a composition that diglycerol 1,6-distearate was 50.9% by weight, diglycerol 1,2-distearate was 1.1% by weight, and the total of diglycerol 1,5-distearate, diglycerol 2,5-distearate and branched diglycerol distearates was 48% by weight. (Preparation of oil-in-water type emulsion (modifier composition) G)

Oil-in-water type emulsion G according to the present invention was obtained in the same manner as that of the preparation of oil-in-water type emulsion A in Example 1 described above, except that 19 parts by weight of the white solid (acetone-crystallization product) obtained as described above was used in place of the diglycerol distearate mixture.

Example 8

(Preparation of oil-in-water type emulsion (modifier composition) H)

Oil-in-water type emulsion H according to the present invention was obtained in the same manner as that of the preparation of oil-in-water type emulsion A in Example 1 described above, except that 12 parts by weight of the diester fraction (diglycerol distearate mixture) obtained in Example 7 was used in place of the diglycerol distearate mixture.

Example 9

(Preparation of modifier composition M having a form of a gel)

Into a beaker were fed 20 parts by weight of the white solid (.acetone-crystallization product) obtained in the above Example 7, 13 parts by weight of a diglycerol monostearate (trade name: Sunsoft Q-18D, mfd. by Taiyo Kagaku Co., Ltd.) and 28 parts by weight of water. The obtained mixture was stirred at 75° C. for 5 minutes. Then the beaker was cooled with ice/water while stirring to give a modifier composition M in the form of a gel.

Example 10

(Preparation of modifier composition N having a form of a gel)

Into a beaker were fed 20 parts by weight of the diglycerol distearates obtained in the above Example 1, 20 parts by weight of a diglycerol monosterate (trade name: Sunsoft Q-18D, mfd. by Taiyo Kagaku Co., Ltd.) and 40 parts by weight of water. The obtained mixture was stirred at 75° C. for 5 minutes. Then the beaker was cooled with ice/water while stirring to give a modifier composition N in the form of a gel.

Comparative Example 1

(Preparation of oil-in-water type emulsion (modifier composition) a)

Oil-in-water type emulsion a as a Comparative Example was obtained in the same manner as that of the preparation of oil-in-water type emulsion A in Example 1 described above, except that a glycerol monostearate (trade name: Excel T-95, mfd. by Kao Corporation) was used in place of the diglycerol distearate mixture.

Comparative Example 2

(Preparation of diglycerol 1,2-distearate)

Into a flask provided with a condenser were fed 100 parts by weight of linear diglycerol, 22 parts by weight of acetone, 0.2 part by weight of sulfuric acid and, for dehydration, 8 parts by weight of molecular sieve 4A, and the contents of the flask were heated under reflux for 8 hours. After cooling, the reaction product was neutralized with the use of 0.1 part by weight of monoethanolamine. The reaction product thus obtained was distilled under reduced pressure to give diglycerol monoisopropylidene.

To 42 parts by weight of the diglycerol monoisopropylidene obtained above were added 134 parts by weight of stearic acid chloride and 35 parts by weight of pyridine and the resulting mixture was stirred at room temperature for 27 hours. Then water and ethyl acetate were added to this mixture, followed by extraction. The ethyl acetate phase was separated therefrom and the ethyl acetate was distilled off under reduced pressure. 200 parts by weight of diethyl ether was added to the residue, which was dissolved therein. To the solution thus obtained was added 300 parts by weight of conc. hydrochloric acid and the resulting mixture was stirred at room temperature for 1 hour. Then the mixture was separated into two phases and the aqueous phase was eliminated. The diethyl ether phase was repeatedly washed with water until the aqueous phase became neutral. The diethyl ether phase was separated therefrom and the diethyl ether was distilled off under reduced pressure. The residue was purified by silica gel column chromatography to give diglycerol 1,2-distearate (containing about 90% by weight). (Preparation of oil-in-water type emulsion (modifier composition) b)

Oil-in-water type emulsion b as a Comparative Example was obtained in the same manner as that of the preparation of oil-in-water type emulsion A in Example 1 described above, except that the diglycerol 1,2-distearate prepared as described above was used in place of the diglycerol distearate mixture.

Comparative Example 3

(Synthesis of a diglycerol stearate mixture from diglycerols comprising linear diglycerol and a branched diglycerol(s), and stearic acid)

249.3 parts by weight of diglycerols comprising 69% of linear diglycerol and 31% of a branched diglycerol(s) were reacted with 853.4 parts by weight of stearic acid at 240° C. under a nitrogen gas stream with stirring for 4.5 hours while eliminating the formed water from the system. Thereafter, the obtained reaction mixture was cooled to give a reaction-terminated product. When its composition was analyzed by gas chromatography, the reaction-terminated product comprised 1.2% of diglycerols, 16.9% of diglycerol monostearates, 43.3% of diglycerol distearates, 31.4% of diglycerol tristearates and 7.2% of diglycerol tetrastearates.

(Preparation of oil-in-water type emulsion (modifier composition) c)

Oil-in-water type emulsion c as a Comparative Example was obtained in the same manner as that of the preparation of oil-in-water type emulsion A in Example 1 described above, except that 34 parts by weight of the reaction-terminated product prepared as described above was used in place of the diglycerol distearate mixture.

Comparative Example 4

As the modifier, use was made of a powdery (crystalline) glycerol fatty acid monoester (trade name: MM-100, mfd. by Riken Vitamin Co., Ltd.).

Comparative Example 5

No modifier was added.

Comparative Example 6

(Preparation of modifier composition d having a form of a gel)

Into a beaker were fed 20 parts by weight of diglycerol monostearates and 40 parts by weight of water. The mixture thus obtained was stirred at 75° C. for 5 minutes. Then the beaker was cooled with ice/water while stirring to give a modifier composition d in the form of a gel.
[Evaluation of modifier compositions]

By using the modifiers and the modifier compositions of the above Examples and Comparative Examples, wheat flour products were produced and the doughs and the wheat flour products produced were evaluated.

1. Evaluation of use of modifier composition in loaf

By using each of the modifier compositions A to E, G, H and a to c prepared as described above, or by using the modifier MM-100, or alternatively without using any modifier composition or modifier, loaf doughes were prepared in accordance with the 70% sponge and dough method and loaves were prepared with the doughes. The formulations are shown in the following Table 1.
(Preparation of sponge dough)

The materials of the sponge dough formulation (1,400 parts by weight of strong flour, 40 parts by weight of yeast, 2 parts by weight of yeast food, 800 parts by weight of water and 40 parts by weight of the modifier composition) were fed into a bowl and kneaded (at a low speed for 2 minutes and at a moderate/high speed for 1 minute) by using a vertical mixer (10 quarts, hook, mfd. by Kanto Kongoki, K. K.) to prepare a sponge dough. The temperature of the sponge dough thus kneaded was 24° C. Next, the sponge dough thus obtained was fermented at a temperature of 27.5° C. under a relative humidity of 75% for 4.5 hours (final temperature of the fermented material: 29.5° C.).

In Comparative Example 4, the modifier was employed in an amount of not 40 parts by weight but 6 parts by weight (namely, 6 parts by weight of the modifier of Comparative Example 4 was added to 2,000 parts by weight of wheat flour).
(Preparation of dough)

Next, to this fermented sponge dough were added the materials of the dough formulation (600 parts by weight of strong flour, 40 parts by weight of common salt, 100 parts by weight of sugar, 40 parts by weight of skim milk powder and 500 parts by weight of water), and the obtained mixture was kneaded (at a low speed for 3 minutes and at a moderate/high speed for 4 minutes). Thereafter, 100 parts by weight of shortening was added thereto and the resulting mixture was kneaded (at a low speed for 2 minutes and at a moderate/high speed for 3 minutes) to give a dough (dough temperature: about 27.5° C.).

The modifier composition E obtained in Example 5 was used not in the preparation of the sponge dough but as a substitute for the shortening (100 parts by weight) among the materials of the dough formulation (namely, 5 parts by weight of the modifier composition E was added per 100 parts by weight of wheat flour).

TABLE 1

|  | Formulation for sponge dough (parts by wt.) | Formulation for dough (parts by wt.) |
| --- | --- | --- |
| strong flour | 1400 | 600 |
| yeast | 40 |  |
| yeast food | 2 |  |
| water | 800 | 500 |
| common salt |  | 40 |
| sugar |  | 100 |
| skim milk powder |  | 40 |
| modifier composition (or modifier) | 40* |  |
| shortening |  | 100 |

*2 parts by weight per 100 parts by weight of wheat flour in the dough-kneading step.

(Baking of loaf)

Next, for the restoration of the above-mentioned dough which had been damaged by kneading, the floor time of 20 minutes was spent at 27.5° C. Thereafter, the dough was divided into portions each weighing 450 g. For the restoration of the doughs which had been damaged by the division, the bench time of 20 minutes was spent at room temperature, and then the divided dough were molded with a molder.

Next, the molded doughes were put into a one-loaf bread mold and introduced into a final proofing room, in which the temperature and the relative humidity were adjusted respectively to 37.5° C. and 80%, and fermented therein for 40 minutes.

The bread doughs thus prepared were baked in an oven (at 210° C.) for 40 minutes to give loaves.

(Evaluation)

The "stickiness of dough" in the production of the above-mentioned loaves and the "feelings during eating (solubility in the mouth and easiness of being cut off with the teeth)" were evaluated.

The "stickiness of dough" and the "feelings during eating (solubility in the mouth and easiness of being cut off with the teeth)" were evaluated by 31 panelists in accordance with the following criteria.

(1) Stickiness of dough

A: the dough is scarcely sticky,

B: the dough is slightly sticky,

C: the dough is sticky but no problem is caused in handling,

D: the dough is sticky and some troubles are caused in handling, and

E: the dough is seriously sticky and the handling is difficult.

(2) Feeling during eating (solubility in the mouth)

A: the solubility in the mouth is extremely excellent,

B: the solubility in the mouth is excellent,

C: the solubility in the mouth is somewhat poor, but acceptable,

D: the solubility in the mouth is somewhat poor, and

E: the solubility in the mouth is poor.

(3) Feeling during eating (easiness of being cut off with the teeth)

A: it is cut off with the teeth extremely easily,

B: it is cut off with the teeth easily,

C: it is cut off with the teeth somewhat poorly, but it is in an acceptable range, D: it is cut off with the teeth somewhat not easily, and E: it is cut off with the teeth poorly.

The results of the above evaluations are shown in the following Table 2.

TABLE 2

|  |  | Results of evaluations (property of dough, feelings of product during eating) | | |
| --- | --- | --- | --- | --- |
| Modifier composition or modifier | | Dough sticki-ness | Solubil-ity in the mouth | Easiness of being cut off with the teeth |
| oil-in-water type emulsion A | (Ex. 1) | A | A | A |
| oil-in-water type emulsion B | (Ex. 2) | A | B | A |
| oil-in-water type emulsion C | (Ex. 3) | B | B | B |
| aqueous dispersion D | (Ex. 4) | B | B | B |
| oil solution or dispersion E | (Ex. 5) | A | A | A |
| oil-in-water type emulsion G | (Ex. 7) | A | B | A |
| oil-in-water type emulsion H | (Ex. 8) | A | A | A |
| oil-in-water type emulsion a | (Comp. Ex. 1) | B | C | D |
| oil-in-water type emulsion b | (Comp. Ex. 2) | B | C | D |
| oil-in-water type emulsion c | (Comp. Ex. 3) | D | C | C |
| MM-100 | (Comp. Ex. 4) | C | E | E |
| no addition | (Comp. Ex. 5) | E | D | D |

As is apparent from the results given in the above Table 2, when the loaves were prepared by adding the modifier compositions of the present invention, the qualities of the doughes were improved and, simultaneously, the feelings during eating were also improved. Regarding the feelings during eating, in particular, the solubility in the mouth and the easiness of being cut off with the teeth were remarkably improved.

2. Evaluation of use of modifier composition in roll

By using each of the modifier compositions A to D, F to H and a to c, or by using the modifier MM-100, or alternatively without using any modifier composition or modifier, rolls were prepared in the same manner as that in the case of the loaves described above, except that the formulations as shown in the following Table 3 were employed, that the conditions for fermentation in the final proofing room were altered to the temperature of 38.5° C. and 45 minutes, and that the baking conditions were altered to 180° C. and 9 minutes, and were evaluated in the same manner as that in the case of the loaves.

The modifier composition F obtained in Example 6 was used not in the preparation of the sponge dough but as a substitute for the margarine (300 parts by weight) among the materials of the dough formulation (namely, 15 parts by weight of the modifier composition F was added to 100 parts by weight of wheat flour).

In Comparative Example 4, the modifier was employed in an amount of not 40 parts by weight but 6 parts by weight (namely, 6 parts by weight of the modifier of Comparative Example 4 was added to 2,000 parts by weight of wheat flour).

The results are shown in the following Table 4.

TABLE 3

|  | Formulation for sponge dough (parts by wt.) | Formulation for dough (parts by wt.) |
|---|---|---|
| strong flour | 1400 | 600 |
| yeast | 50 | |
| yeast food | 2 | |
| egg | 200 | |
| water | 720 | 460 |
| common salt | | 34 |
| sugar | | 240 |
| skim milk powder | | 40 |
| modifier composition (or modifier) | 40* | |
| margarine | | 300 |

*2 parts by weight per 100 parts by weight of wheat flour in the dough-kneading step.

TABLE 4

| | | Results of evaluations (property of dough, feelings of product during eating) | | |
|---|---|---|---|---|
| Modifier composition or modifier | | Dough sticki- ness | Solubil- ity in the mouth | Easiness of being cut off with the teeth |
| oil-in-water type emulsion A | (Ex. 1) | A | A | A |
| oil-in-water type emulsion B | (Ex. 2) | A | B | A |
| oil-in-water type emulsion C | (Ex. 3) | B | B | B |
| aqueous dispersion D | (Ex. 4) | B | B | B |
| water-in-oil type emulsion F | (Ex. 6) | A | A | A |
| oil-in-water type emulsion G | (Ex. 7) | A | B | A |
| oil-in-water type emulsion H | (Ex. 8) | A | A | A |
| oil-in-water type emulsion a | (Comp. Ex. 1) | B | C | D |
| oil-in-water type emulsion b | (Comp. Ex. 2) | B | C | D |
| oil-in-water type emulsion c | (Comp. Ex. 3) | D | C | C |
| MM-100 | (Comp. Ex. 4) | C | E | E |
| no addition | (Comp. Ex. 5) | E | D | D |

As is apparent from the results given in the above Table 4, when the rolls were prepared by adding the modifier compositions of the present invention, the qualities of the doughes were improved and, simultaneously, the feelings during eating were also improved, similar to the case of the loaves. Regarding the feelings during eating, in particular, the solubility in the mouth and the easiness of being cut off with the teeth were remarkably improved.

3. Evaluation of use of modifier composition in sweet bun

Sweet buns were prepared in the same manner as that in the case of the loaves described above, except that the formulations as shown in the following Table 5 were employed, that the conditions in the floor time were altered to 27° C. and 1 hour, that the conditions for fermentation in the final proofing room were altered to the temperature of 38° C. and 50 minutes, and that the baking conditions were altered to 180° C. and 9 minutes, and were evaluated in the same manner as that in the case of the loaves.

The modifier composition E obtained in Example 5 was used not in the preparation of the sponge dough but as a substitute for the shortening (100 parts by weight) among the materials of the dough formulation (namely, 10 parts by weight of the modifier composition E was added to 100 parts by weight of wheat flour).

In Comparative Example 4, the modifier was employed in an amount of not 20 parts by weight but 3 parts by weight (namely, 3 parts by weight of the modifier of Comparative Example 4 was added to 1,000 parts by weight of wheat flour).

The results are shown in the following Table 6.

TABLE 5

|  | Formulation for sponge dough (parts by wt.) | Formulation for dough (parts by wt.) |
|---|---|---|
| strong flour | 700 | 300 |
| yeast | 30 | |
| yeast food | 1 | |
| egg | 50 | |
| glucose | 50 | |
| water | 380 | 182 |
| common salt | | 10 |
| sugar | | 200 |
| skim milk powder | | 20 |
| modifier composition (or modifier) | 20* | |
| shortening | | 100 |

*2 parts by weight per 100 parts by weight of wheat flour employed in the dough-kneading step.

TABLE 6

| | | Results of evaluations (property of dough, feelings of product during eating) | | |
|---|---|---|---|---|
| Modifier composition or modifier | | Dough sticki- ness | Solubil- ity in the mouth | Easiness of being cut off with the teeth |
| oil-in-water type emulsion A | (Ex. 1) | B | A | A |
| oil-in-water type emulsion B | (Ex. 2) | B | B | A |
| oil-in-water type emulsion C | (Ex. 3) | C | B | B |
| aqueous dispersion D | (Ex. 4) | B | B | B |
| oil solution or dispersion E | (Ex. 5) | B | A | A |
| oil-in-water type emulsion G | (Ex. 7) | A | B | A |
| oil-in-water type emulsion H | (Ex. 8) | A | A | A |
| oil-in-water type emulsion a | (Comp. Ex. 1) | C | C | D |
| oil-in-water type emulsion b | (Comp. Ex. 2) | C | C | D |
| oil-in-water type | (Comp. Ex. 3) | D | C | C |

TABLE 6-continued

| Modifier composition or modifier | | Results of evaluations (property of dough, feelings of product during eating) | | |
|---|---|---|---|---|
| | | Dough sticki- ness | Solubil- ity in the mouth | Easiness of being cut off with the teeth |
| emulsion c | | | | |
| MM-100 | (Comp. Ex. 4) | D | E | E |
| no addition | (Comp. Ex. 5) | E | D | D |

As is apparent from the results given in the above Table 6, when the sweet buns were prepared by adding the modifier compositions of the present invention, the qualities of the doughes were improved and, simultaneously, the feelings during eating were also improved, similar to the case of the loaves. Regarding the feelings during eating, in particular, the solubility in the mouth and the easiness of being cut off with the teeth were remarkably improved.

4. Evaluation of use of modifier composition in noodle

By using the modifier composition D obtained in Example 4 or without using any modifier composition, noodles were prepared in the following manner.

(Preparation of noodle)

20 parts by weight of the modifier composition obtained in Example 4 and 50 parts by weight of common salt were added to 375 parts by weight of water to prepare a saline solution. 445 parts by weight of this saline solution and 1.000 parts by weight of wheat flour (medium flour) were kneaded together in a horizontal pin mixer for 10 minutes to give a dough. The obtained dough was rolled out with a roller and cut to prepare a noodle. Separately, the noodle of Comparative Example 5 was prepared in the same manner, except that no modifier composition used and that the amount of the water was altered to 393 parts by weight.

(Evaluation)

The noodles thus obtained were boiled in boiling water for 10 minutes. The surface roughness and the feelings during eating of the boiled noodles were evaluated. The state of the surface roughness (fine splits) of the boiled product was evaluated with the naked eye in accordance with the following criteria, while the feelings during eating (viscoelasticity and easiness of being cut off with the teeth) were respectively evaluated on the basis of the same criteria as those in the evaluation in the case of the loaves described above.

(1) Surface-roughness-state

A: the surface roughness is scarcely observed,

B: the surface roughness is slightly observed,

C: the surface roughness is partly observed but acceptable,

D: the surface roughness is observed all over, and

E: the surface roughness is seriously observed.

The results are shown in the following Table 7.

TABLE 7

| | | Product after boiling Surface roughness | Feeling of product during eating | |
|---|---|---|---|---|
| Modifier composition | | | Visco- elasticity | Easiness of being cut off with the teeth |
| aqueous dispersion D | (Ex. 4) | B | B | B |
| no addition | (Comp. Ex. 5) | C | C | C |

As is apparent from the results given in the above Table 7, the addition of the modifier composition of the present invention made the noodle highly viscoelastic, enhanced the easiness of being cut off with the teeth and suppressed the surface roughness, thus improving the qualities of the product.

5. Evaluation of use of modifier composition in water-enriched bread

By using each of the modifier compositions A, D, E, M, N and a to d, or by using the modifier MM-100, or alternatively without using any modifier composition or modifier, water-enriched breads were prepared in the same manner as that in the case of the loaves described above, except that the formulations as shown in the following Table 8 were employed.

The "stickiness of dough" and the "feelings during eating (solubility in the mouth and easiness of being cut off with the teeth)" were evaluated similar to the case of the loaves. Further, the "feeling during eating (softness)" was evaluated in accordance with the following criteria.

(1) Feeling during eating (softness)

A: very soft,

B: soft,

C: somewhat soft,

D: somewhat poor, and

E: not soft.

The results are shown in the following Table 9.

TABLE 8

| | Formulation for sponge dough (parts by wt.) | Formulation for dough (parts by wt.) |
|---|---|---|
| strong flour | 1400 | 600 |
| yeast | 40 | |
| yeast food | 2 | |
| water | 880 | 500 |
| common salt | | 40 |
| sugar | | 100 |
| skim milk powder | | 40 |
| modifier composition (or modifier) | * | |

| *: oil-in-water type emulsion A | (Ex. 1) 40 parts by weight |
|---|---|
| aqueous dispersion D | (Ex. 4) 40 |
| oil solution or dispersion E | (Ex. 5) 40 |
| modifier composition M | (Ex. 9) 18 |
| modifier composition N | (Ex. 10) 16 |
| oil-in-water type emulsion a | (Comp. Ex. 1) 40 |
| oil-in-water type emulsion b | (Comp. Ex. 2) 40 |
| oil-in-water type emulsion c | (Comp. Ex. 3) 40 |
| modifier composition d | (Comp. Ex. 6) 16 |
| MM-100 | (Comp. Ex. 4) 6 |
| no addition | (Comp. Ex. 5) 0 |

TABLE 9

| Modifier or modifier composition | | Results of evaluations (property of dough, feelings of product during eating) | | | |
|---|---|---|---|---|---|
| | | Dough stickiness | Solubility in the mouth | Easiness of being cut off with the teeth | Softness |
| oil-in-water type emulsion A | (Ex. 1) | B | B | B | B |
| aqueous dispersion D | (Ex. 4) | C | C | B | B |
| oil solution or dispersion E | (Ex. 5) | B | B | A | B |
| modifier composition M | (Ex. 9) | A | A | A | A |
| modifier composition N | (Ex. 10) | A | A | A | A |
| oil-in-water type emulsion a | (Comp. Ex. 1) | E | E | E | A |
| oil-in-water type emulsion b | (Comp. Ex. 2) | D | E | E | B |
| oil-in-water type emulsion c | (Comp. Ex. 3) | C | E | E | A |
| modifier composition d | (Comp. Ex. 6) | E | E | E | A |
| MM-100 | (Comp. Ex. 4) | E | E | E | A |
| no addition | (Comp. Ex. 5) | E | E | E | C |

As is apparent from the results given in the above Table 9, when the water-enriched breads were prepared by adding the modifier compositions of the present invention, the qualities of the doughes were improved and, simultaneously, the feelings during eating were also improved, similar to the case of the loaves. Regarding the feelings during eating, in particular, the solubility in the mouth and the easiness of being cut off with the teeth were remarkably improved.

We claim:

1. An edible modifier for protein-containing materials, said modifier comprising a diglycerol saturated fatty acid diester mixture containing a diglycerol saturated fatty acid diester(s) having two monohydroxymonoacyloxy(iso) propyl groups, wherein the acyl groups are derived from saturated fatty acids having 10 to 24 carbon atoms and the two acyl groups are the same or different from each other, in an amount of 80% by weight or more based on the total weight of the diglycerol saturated fatty acid diesters contained in the mixture; wherein the mixture is dispersed in water.

2. The modifier for protein-containing materials as claimed in claim 1, which contains the diglycerol saturated fatty acid diester(s) having two monohydroxymonoacyloxy (iso)propyl groups in an amount of 1% by weight or more based on the entire weight of the modifier.

3. The modifier for protein-containing materials as claimed in claim 1, wherein the weight ratio of the diglycerol saturated fatty acid diester mixture to the water is from 2 to ⅟1000.

4. The modifier for protein-containing materials as claimed in claim 1, which is in the form of a gel.

5. An edible modifier for protein-containing materials, said modifier comprising a diglycerol saturated fatty acid diester mixture containing a diglycerol saturated fatty acid 1,6-diester(s), wherein the carbon atom numbers of the fatty acid are from 10 to 24, in an amount of 40% by weight or more based on the total weight of the diglycerol saturated fatty acid diesters contained in the mixture, and water; wherein the mixture is dispersed in the water.

6. The modifier for protein-containing materials as claimed in claim 5, which contains the diglycerol saturated fatty acid 1,6-diester(s) in an amount of 0.5% by weight or more based on the entire weight of the modifier.

7. The modifier for protein-containing materials as claimed in claim 5, wherein the weight ratio of the diglycerol saturated fatty acid diester mixture to the water is from 2 to ⅟1000.

8. The modifier for protein-containing materials as claimed in claim 5, which is in the form of a gel.

9. An edible modifier for protein-containing materials, said modifier comprising a diglycerol saturated fatty acid diester mixture containing at least one member selected from the group consisting of diglycerol saturated fatty acid diesters represented by the following formulae (I), (II) and (III) in an amount of 60% by weight or more based on the total weight of the diglycerol saturated fatty acid diesters contained in the mixture, and water; wherein the mixture of dispersed in the water:

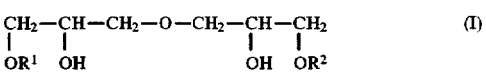

$$CH_2-CH-CH_2-O-CH_2-CH-CH_2 \quad (I)$$
$$\;\;|\;\;\;\;\;\;|\;\;\;\;\;\;\;\;\;\;\;\;\;\;\;\;\;\;\;\;\;|\;\;\;\;\;\;|$$
$$OR^1\;\;OH\;\;\;\;\;\;\;\;\;\;\;\;\;\;\;\;OH\;\;OR^2$$

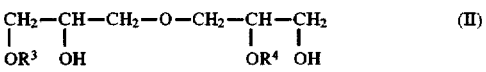

$$CH_2-CH-CH_2-O-CH_2-CH-CH_2 \quad (II)$$
$$\;\;|\;\;\;\;\;\;|\;\;\;\;\;\;\;\;\;\;\;\;\;\;\;\;\;\;\;\;\;|\;\;\;\;\;\;|$$
$$OR^3\;\;OH\;\;\;\;\;\;\;\;\;\;\;\;\;\;\;OR^4\;\;OH$$

and

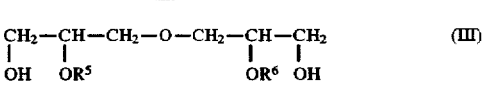

$$CH_2-CH-CH_2-O-CH_2-CH-CH_2 \quad (III)$$
$$\;\;|\;\;\;\;\;\;|\;\;\;\;\;\;\;\;\;\;\;\;\;\;\;\;\;\;\;\;\;|\;\;\;\;\;\;|$$
$$OH\;\;OR^5\;\;\;\;\;\;\;\;\;\;\;\;\;\;\;OR^6\;\;OH$$

wherein $R^1$, $R^2$, $R^3$, $R^4$, $R^5$ and $R^6$ each independently represents a saturated aliphatic acyl group having 10 to 24 carbon atoms.

10. The modifier for protein-containing materials as claimed in claim 9, which contains the diglycerol saturated fatty acid diester(s) represented by the above formulae (I), (II) and (III) in an amount of 1% by weight or more based on the entire weight of the modifier.

11. The modifier for protein-containing materials as claimed in claim 9, which contains the diglycerol saturated fatty acid 1,6-diester(s) represented by formula (I) in an amount of 0.5% by weight or more based on the entire weight of the modifier.

12. The modifier for protein-containing materials as claimed in claim 9, wherein the weight ratio of the diglycerol saturated fatty acid diester mixture to the water is from 2 to ⅟1000.

13. The modifier for protein-containing materials as claimed in claim 9, which is in the form of a gel.

14. An edible modifier for protein-containing materials, said modifier comprising a diglycerol saturated fatty acid diester mixture containing a diglycerol saturated fatty acid diester(s) having two monohydroxymonoacyloxy(iso) propyl groups, wherein the acyl groups are derived from saturated fatty acids having 10 to 24 carbon atoms and the two acyl groups are the same or different from each other, in an amount of 80% by weight or more based on the total weight of the diglycerol saturated fatty acid diesters contained in the mixture, and a fat and/or oil; wherein the mixture is dissolved or dispersed in the fat and/or oil.

15. The modifier for protein-containing materials as claimed in claim 14, which contains the diglycerol saturated fatty acid diester(s) having two monohydroxymonoacyloxy- (iso)propyl groups in an amount of 1% by weight or more based on the entire weight of the modifier.

16. The modifier for protein-containing materials as claimed in claim 14, wherein the weight ratio of the diglycerol saturated fatty acid diester mixture to the fat and/or oil is from 0.5 to 1/1000.

17. A modifier for protein-containing materials which comprises a diglycerol saturated fatty acid diester mixture containing a diglycerol saturated fatty acid 1,6-diester(s), wherein the carbon atom numbers of the fatty acids are from 10 to 24, in an amount of 40% by weight or more based on the total weight of the diglycerol saturated fatty acid diesters contained in the mixture, and a fat and/or oil; wherein the mixture is dissolved or dispersed in the fat and/or oil.

18. The modifier for protein-containing materials as claimed in claim 17, which contains the diglycerol saturated fatty acid 1,6-diester(s) in an amount of 0.5% by weight or more based on the entire weight of the modifier.

19. The modifier for protein-containing materials as claimed in claim 17, wherein the weight ratio of the diglycerol saturated fatty acid diester mixture to the fat and/or oil is from 0.5 to 1/1000.

20. An edible modifier for protein-containing materials, said modifier comprising a diglycerol saturated fatty acid diester mixture containing at least one member selected from the group consisting of diglycerol saturated fatty acid diesters represented by the following formulae (I), (II) and (III) in an amount of 60% by weight or more based on the total weight of the diglycerol saturated fatty acid diesters contained in the mixture, and a fat and/or oil; wherein the mixture is dissolved or dispersed in the fat and/or oil:

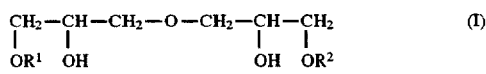

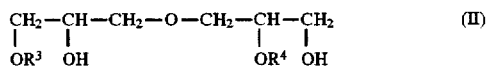

and

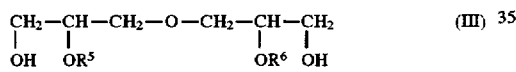

wherein $R^1$, $R^2$, $R^3$, $R^4$, $R^5$ and $R^6$ each independently represents a saturated aliphatic acyl group having 10 to 24 carbon atoms.

21. The modifier for protein-containing materials as claimed in claim 20, which contains the diglycerol saturated fatty acid diester(s) represented by the above formulae (I), (II) and (III) in an amount of 1% by weight or more based on the entire weight of the modifier.

22. The modifier for protein-containing materials as claimed in claim 20, which contains the diglycerol saturated fatty acid 1,6-diester(s) represented by formula (I) in an amount of 0.5% by weight or more based on the entire weight of the modifier.

23. The modifier for protein-containing materials as claimed in claim 20, wherein the weight ratio of the diglycerol saturated fatty acid diester mixture to the fat and/or oil is from 0.5 to 1/1000.

24. An edible modifier for protein-containing materials, said modifier comprising, based on the entire weight of the modifier, 1 to 50% by weight of a diglycerol saturated fatty acid diester mixture containing a diglycerol saturated fatty acid diester(s) having two monohydroxymonoacyloxy(iso)propyl groups, wherein the acyl groups are derived from saturated fatty acids having 10 to 24 carbon atoms and the two acyl groups are the same or different from each other, in an amount of 80% by weight or more based on the total weight of the diglycerol saturated fatty acid diesters contained in the mixture, 5 to 50% by weight of an edible fat(s) and/or oils(s), and/or a diglyceride(s), and 20 to 85% by weight of water; and is in the form of an oil-in-water type emulsion.

25. The modifier for protein-containing materials as claimed in claim 24, which further comprises 5 to 40% by weight, based on the entire weight of the modifier, of a sugar(s).

26. An edible modifier for protein-containing materials, said modifier comprising based on the entire weight of the modifier, 1 to 50% by weight of a diglycerol saturated fatty acid diester mixture containing a diglycerol saturated fatty acid 1,6-diester(s), wherein the carbon atom numbers of the fatty acids are from 10 to 24, in an amount of 40% by weight or more based on the total weight of the diglycerol saturated fatty acid diesters contained in the mixture, 5 to 50% by weight of an edible fat(s) and/or oil(s), and/or a digyceride(s), and 20 to 85% by weight of water; and is in the form of an oil-in-water type emulsion.

27. The modifier for protein-containing materials as claimed in claim 26, which further comprises 5 to 40% by weight, based on the entire weight of the modifier, of a sugar(s).

28. An edible modifier for protein-containing materials, said modifier comprising, based on the entire weight of the modifier, 1 to 50% by weight of a diglycerol saturated fatty acid diester mixture containing at least one member selected from the group consisting of diglycerol saturated fatty acid diesters represented by the following formulae (I), (II) and (III) in an amount of 60% by weight or more based on the total weight of the diglycerol saturated fatty acid diesters contained in the mixture, 5 to 50% by weight of an edible fat(s) and/or oil(s), and/or a diglyceride(s), and 20 to 85% by weight of water; and is in the form of an oil-in-water type emulsion:

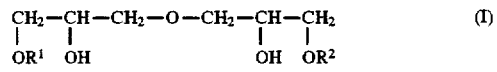

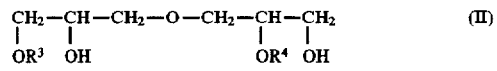

and

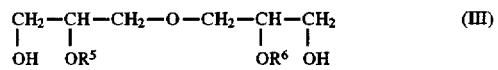

wherein $R^1$, $R^2$, $R^3$, $R^4$, $R^5$ and $R^6$ each independently represents a saturated aliphatic acyl group having 10 to 24 carbon atoms.

29. The modifier for protein-containing materials as claimed in claim 28, which further comprises 5 to 40% by weight, based on the entire weight of the composition, of a sugar(s).

30. An edible modifier for protein-containing materials, said modifier comprising, based on the entire weight of the modifier, 1 to 50% by weight of a diglycerol saturated fatty acid diester mixture containing a diglycerol saturated fatty acid diester(s) having two monohydroxymonoacyloxy(iso)propyl groups, wherein the acyl groups are derived from saturated fatty acids having 10 to 24 carbon atoms and the two acyl groups are the same or different from each other, in an amount of 80% by weight or more based on the total weight of the diglycerol saturated fatty acid diesters contained in the mixture, 30 to 99% by weight of an edible fat(s) and/or oil(s), and/or a diglyceride(s), and 0.1 to 60% by weight of water; and is in the form of a water-in-oil type emulsion.

31. An edible modifier for protein-containing materials, said modifier comprising, based on the entire weight of the modifier, 1 to 50% by weight of a diglycerol saturated fatty acid diester mixture containing a diglycerol saturated fatty acid 1,6-diester(s), wherein the carbon atom numbers of the fatty acids are about 10 to 24, in an amount of 40% by weight or more based on the total weight of the diglycerol saturated fatty acid diesters contained in the mixture, 30 to 99% by weight of an edible fat(s) and/or oil(s), and/or a diglyceride(s), and 0.1 to 60% by weight of water; and is in the form of a water-in-oil type emulsion.

32. An edible modifier for protein-containing materials, said modifier comprising based on the entire weight of the modifier, 1 to 50% by weight of a diglycerol saturated fatty acid diester mixture containing at least one member selected from the group consisting of diglycerol saturated fatty acid diesters represented by the following formulae (I), (II) and (III) in an amount of 60% by weight or more based on the total weight of the diglycerol saturated fatty acid diesters contained in the mixture, 30 to 99% by weight of an edible fat(s) and/or oil(s), and/or a diglyceride(s), and 0.1 to 60% by weight of water; and is in the form of a water-in-oil type emulsion:

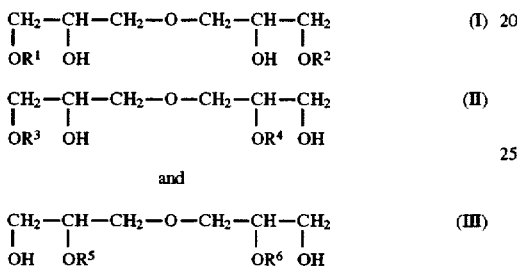

wherein $R^1$, $R^2$, $R^3$, $R^4$, $R^5$ and $R^6$ each independently represents a saturated aliphatic acyl group having 10 to 24 carbon atoms.

33. A composition, comprising:

(a) an edible modifier for protein-containing materials, said modifier comprising at least one diglycerol saturated fatty acid diester having two monohydroxymonoacyloxy-(iso)propyl groups, wherein the acyl groups are derived from saturated fatty acids having 10 to 24 carbon atoms and the two acyl groups are the same or different from each other, and said at least one diglycerol saturated fatty acid diester having two monohydroxymonoacyloxy-(iso)propyl groups comprises at least 80% by weight of the total weight of the diglycerol saturated acid diesters contained in said modifier; and (b) a protein-containing material.

34. The composition of claim 33, wherein said material is a food.

35. The composition of claim 33, wherein said modifier comprises 45% or more by weight of diglycerol saturated fatty acid esters.

36. A composition, comprising:

(a) an edible modifier for protein-containing materials, said modifier comprising at least one diglycerol saturated fatty acid 1,6-diester having two monohydroxymonoacyloxy-(iso)propyl groups, wherein the acyl groups are derived from saturated fatty acids having 10 to 24 carbon atoms and the two acyl groups are the same or different from each other, and said at least one diglycerol saturated fatty acid 1,6-diester having two monohydroxymonoacyloxy-(iso)propyl groups comprises at least 40% by weight of the total weight of the diglycerol saturated acid diesters contained in said modifier; and (b) a protein-containing material.

37. The composition of claim 36, wherein said material is a food.

38. The composition of claim 36, wherein said modifier comprises 45% or more by weight of diglycerol saturated fatty acid esters.

39. A composition, comprising:

(a) an edible modifier for protein-containing materials, said modifier comprising at least one diglycerol saturated fatty acid diester selected from the group consisting of the diesters represented by formula (I), (II) and (III):

$$\begin{array}{l}CH_2-CH-CH_2-O-CH_2-CH-CH_2 \\ \ \ |\ \ \ \ \ \ \ |\ \ \ \ \ \ \ \ \ \ \ \ \ \ \ \ \ \ \ \ \ \ \ |\ \ \ \ \ \ \ | \\ OR^1\ OH\ \ \ \ \ \ \ \ \ \ \ \ \ \ \ \ OH\ OR^2\end{array} \quad (I)$$

$$\begin{array}{l}CH_2-CH-CH_2-O-CH_2-CH-CH_2 \\ \ \ |\ \ \ \ \ \ \ |\ \ \ \ \ \ \ \ \ \ \ \ \ \ \ \ \ \ \ \ \ \ \ |\ \ \ \ \ \ \ | \\ OR^3\ OH\ \ \ \ \ \ \ \ \ \ \ \ \ \ \ \ OR^4\ OH\end{array} \quad (II)$$

and $$\begin{array}{l}CH_2-CH-CH_2-O-CH_2-CH-CH_2 \\ \ \ |\ \ \ \ \ \ \ |\ \ \ \ \ \ \ \ \ \ \ \ \ \ \ \ \ \ \ \ \ \ \ |\ \ \ \ \ \ \ | \\ OH\ OR^5\ \ \ \ \ \ \ \ \ \ \ \ \ \ \ \ OR^6\ OH\end{array} \quad (III)$$

wherein $R^1$, $R^2$, $R^3$, $R^4$, $R^5$ and $R^6$ each, independently, represents a saturated aliphatic acyl group having 10 to 24 carbon atoms, and said at least one diglycerol saturated fatty acid diester comprises at least 60% by weight of the total weight of the diglycerol saturated acid diesters contained in said modifier; and (b) a protein-containing material.

40. The composition of claim 39, wherein said material is a food.

41. The composition of claim 39, wherein said modifier comprises 45% or more by weight of diglycerol saturated fatty acid esters.

42. A composition, comprising:

(a) at least one diglycerol saturated fatty acid diester having two monohydroxymonoacyloxy-(iso)propyl groups, wherein the acyl groups are derived from saturated fatty acids having 10 to 24 carbon atoms and the two acyl groups are the same or different from each other; and (b) a wheat flour, wherein said at least one diglycerol saturated fatty acid diester having two monohydroxymonoacyloxy-(iso)propyl groups comprises at least 80% by weight of the total weight of the diglycerol saturated acid diesters contained in the composition.

43. The composition of claim 42, which is in the form of a dough, a bread, a noodle or a baked cake.

44. A composition, comprising:

(a) at least one diglycerol saturated fatty acid 1,6-diester having two monohydroxymonoacyloxy-(iso)propyl groups, wherein the acyl groups are derived from saturated fatty acids having 10 to 24 carbon atoms and the two acyl groups are the same or different from each other; and (b) a wheat flour, wherein said at least one diglycerol saturated fatty acid 1,6-diester having two monohydroxymonoacyloxy-(iso)propyl groups comprises at least 40% by weight of the total weight of the diglycerol saturated acid diesters contained in the composition.

45. The composition of claim 44, which is in the form of a dough, a bread, a noodle or a baked cake.

46. A composition, comprising:
(a) at least one diglycerol saturated fatty acid diester selected from the group consisting of the diesters represented by formula (I), (II) and (III):

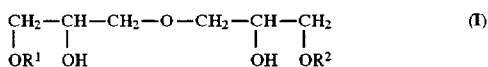

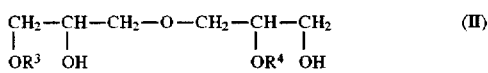

and

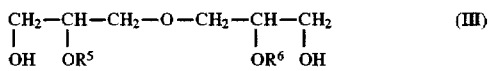

wherein $R^1$, $R^2$, $R^3$, $R^4$, $R^5$ and $R^6$ each, independently, represents a saturated aliphatic acyl group having 10 to 24 carbon atoms; and
(b) a wheat flour,
wherein said at least one diglycerol saturated fatty acid diester comprises at least 60% by weight of the total weight of the diglycerol saturated acid diesters contained in the composition.

47. The composition of claim 46, which is in the form of a dough, a bread, a noodle or a baked cake.

48. A method of modifying a protein-containing material, comprising combining said material with a modifier comprising at least one diglycerol saturated fatty acid diester having two monohydroxymonoacyloxy-(iso)propyl groups, wherein the acyl groups are derived from saturated fatty acids having 10 to 24 carbon atoms and the two acyl groups are the same or different from each other, and
said at least one diglycerol saturated fatty acid diester having two monohydroxymonoacyloxy-(iso)propyl groups comprises at least 80% by weight of the total weight of the diglycerol saturated acid diesters contained in said modifier.

49. The method of claim 48, wherein said material is a food.

50. A method of modifying a protein-containing material, comprising combining said material with a modifier comprising at least one diglycerol saturated fatty acid 1,6-diester having two monohydroxymonoacyloxy-(iso)propyl groups, wherein the acyl groups are derived from saturated fatty acids having 10 to 24 carbon atoms and the two acyl groups are the same or different from each other, and
said at least one diglycerol saturated fatty acid 1,6-diester having two monohydroxymonoacyloxy-(iso)propyl groups comprises at least 40% by weight of the total weight of the diglycerol saturated acid diesters contained in said modifier.

51. The method of claim 50, wherein said material is a food.

52. A method of modifying a protein-containing material, comprising combining said material with a modifier comprising at least one diglycerol saturated fatty acid diester selected from the group consisting of the diesters represented by formula (I), (II) and (III):

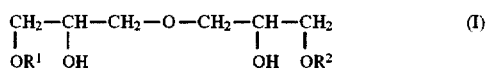

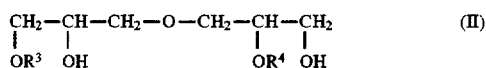

and

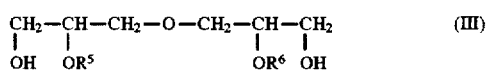

wherein $R^1$, $R^2$, $R^3$, R, $R^5$ and $R^6$ each, independently, represents a saturated aliphatic acyl group having 10 to 24 carbon atoms, and
said wherein said at least one diglycerol saturated fatty acid diester comprises at least 60% by weight of the total weight of the diglycerol saturated acid diesters contained in said modifier.

53. The method of claim 52, wherein said material is a food.

* * * * *

UNITED STATES PATENT AND TRADEMARK OFFICE
CERTIFICATE OF CORRECTION

PATENT NO. : 5,789,011
DATED : August 4, 1998
INVENTOR(S) : Jun KOBORI et. al

It is certified that error appears in the above-indentified patent and that said Letters Patent is hereby corrected as shown below:

On the Title page, Item [86], the PCT information, is incorrect. It should be:

-- PCT No.:      PCT/JP95/01242
   §371 Date:    Aug. 19, 1996
   §102(e)Date:  Aug. 19, 1996--

Signed and Sealed this

Thirtieth Day of March, 1999

Attest:

Q. TODD DICKINSON

Attesting Officer    Acting Commissioner of Patents and Trademarks